(12) United States Patent
Lieb et al.

(10) Patent No.: US 9,471,694 B2
(45) Date of Patent: Oct. 18, 2016

(54) METHOD AND SYSTEM FOR BROWSER-BASED CONTROL OF A REMOTE COMPUTER

(75) Inventors: Adam Michael Lieb, San Francisco, CA (US); James L. Benton, San Francisco, CA (US)

(73) Assignee: CLEARSLIDE, INC., San Francisco, CA (US)

( * ) Notice: Subject to any disclaimer, the term of this patent is extended or adjusted under 35 U.S.C. 154(b) by 376 days.

(21) Appl. No.: 13/484,253

(22) Filed: May 30, 2012

(65) Prior Publication Data

US 2012/0317487 A1   Dec. 13, 2012

Related U.S. Application Data

(60) Provisional application No. 61/491,319, filed on May 30, 2011.

(51) Int. Cl.
```
G06F 3/00        (2006.01)
G06F 17/30       (2006.01)
G06F 3/0481      (2013.01)
G06F 21/31       (2013.01)
G06F 21/36       (2013.01)
```
(Continued)

(52) U.S. Cl.
CPC ......... *G06F 17/30873* (2013.01); *G06F 1/163* (2013.01); *G06F 3/011* (2013.01); *G06F 3/016* (2013.01); *G06F 3/0481* (2013.01); *G06F 3/04886* (2013.01); *G06F 9/4443* (2013.01); *G06F 9/4445* (2013.01); *G06F 17/241* (2013.01); *G06F 17/30899* (2013.01); *G06F 21/00* (2013.01); *G06F 21/31* (2013.01); *G06F 21/36* (2013.01); *G06Q 10/10* (2013.01); *H04N 5/74* (2013.01)

(58) Field of Classification Search
CPC ..... G06F 3/0481; G06F 17/241; H04N 5/74; G06Q 10/10; G11B 27/105; H04L 12/1822; H04L 12/1813

See application file for complete search history.

(56) References Cited

U.S. PATENT DOCUMENTS 5,654,726 A   8/1997   Mima et al.
6,295,551 B1  9/2001   Roberts et al.
(Continued)

FOREIGN PATENT DOCUMENTS

WO   2009140766 A1   2/2009

OTHER PUBLICATIONS

Tristan Richardson, Quentin Stafford-Fraser, Kenneth R. Wood, and Andy Hopper; "Virtual Network Computing"; published in IEEE Internet Computing vol. 2 No. 1 in Jan./Feb. 1998.*

(Continued)

*Primary Examiner* — Doon Chow
*Assistant Examiner* — Shourjo Dasgupta
(74) *Attorney, Agent, or Firm* — Perkins Coie LLP

(57) ABSTRACT

A method and system for remote control of a presenter's computer screen using only web browsers is described. Viewers are able to view representation of a presenter's screen on a screen of the viewer's device and remotely control the presenter's screen directly from a web browser, without any downloads, plugins, or dialog boxes. Viewer control events are captured by the browser, sent to a server, and transmitted to the presenter's computer. A program running on the presenter's computer executes the control events, updates the presenter's screen, and transmits images of the updated screen back to the viewers.

32 Claims, 11 Drawing Sheets

(51) Int. Cl.

| | | |
|---|---|---|
| *G06F 17/24* | (2006.01) | |
| *G06F 1/16* | (2006.01) | |
| *G06F 21/00* | (2013.01) | |
| *G06F 3/01* | (2006.01) | |
| *G06F 9/44* | (2006.01) | |
| *H04N 5/74* | (2006.01) | |
| *G06F 3/0488* | (2013.01) | |
| *G06Q 10/10* | (2012.01) | |

(56) References Cited

U.S. PATENT DOCUMENTS

| | | | |
|---|---|---|---|
| 7,127,745 B1 * | 10/2006 | Herse et al. | 726/30 |
| 7,533,146 B1 | 5/2009 | Kumar | |
| 2002/0013833 A1 | 1/2002 | Wyatt et al. | |
| 2002/0016861 A1 | 2/2002 | Simonoff | |
| 2002/0038346 A1 | 3/2002 | Morrison et al. | |
| 2002/0073155 A1 | 6/2002 | Anupam et al. | |
| 2002/0194611 A1 | 12/2002 | Hodgkinson | |
| 2003/0182375 A1 | 9/2003 | Zhu et al. | |
| 2003/0212744 A1 | 11/2003 | Dunlap et al. | |
| 2004/0080504 A1 | 4/2004 | Salesky et al. | |
| 2004/0083236 A1 | 4/2004 | Rust | |
| 2004/0181579 A1 | 9/2004 | Huck et al. | |
| 2005/0132299 A1 | 6/2005 | Jones et al. | |
| 2006/0075359 A1 | 4/2006 | Bauchot et al. | |
| 2006/0218285 A1 * | 9/2006 | Talwar et al. | 709/227 |
| 2007/0208992 A1 | 9/2007 | Koren | |
| 2007/0245248 A1 | 10/2007 | Christiansen | |
| 2007/0266325 A1 * | 11/2007 | Helm et al. | 715/733 |
| 2007/0294626 A1 | 12/2007 | Fletcher et al. | |
| 2008/0016155 A1 | 1/2008 | Khalatian | |
| 2008/0059583 A1 | 3/2008 | Mao et al. | |
| 2008/0162635 A1 | 7/2008 | Keren et al. | |
| 2008/0267178 A1 * | 10/2008 | Emmerich et al. | 370/389 |
| 2009/0055822 A1 * | 2/2009 | Tolman et al. | 718/1 |
| 2009/0292999 A1 * | 11/2009 | LaBine et al. | 715/740 |
| 2010/0257449 A1 | 10/2010 | Lieb et al. | |
| 2011/0083076 A1 | 4/2011 | Kang et al. | |
| 2011/0093773 A1 | 4/2011 | Yee | |
| 2011/0126130 A1 | 5/2011 | Lieb et al. | |
| 2011/0173256 A1 | 7/2011 | Khalatian et al. | |
| 2011/0276619 A1 | 11/2011 | Khan et al. | |
| 2011/0276900 A1 | 11/2011 | Khan et al. | |
| 2012/0030579 A1 | 2/2012 | Morard et al. | |
| 2012/0191784 A1 | 7/2012 | Lee et al. | |
| 2014/0032735 A1 | 1/2014 | Kapoor | |
| 2014/0126708 A1 | 5/2014 | Sayko et al. | |
| 2015/0039998 A1 | 2/2015 | Lieb et al. | |

OTHER PUBLICATIONS

Final Office Action mailed Aug. 9, 2013, in Co-Pending U.S. Appl. No. 12/953,054, filed Nov. 23, 2010.

Berena, A.J., et al., Shared Virtual Presentation Board for e-Communication on the WebELS Platform, Proceedings of the 18th International Conference on Computers in Education (ICCE 2010), pp. 280-284, 2010.

Co-pending U.S. Appl. No. 12/953,054, filed Nov. 23, 2010.

International Application No. PCT/US2012/040054, International Search Report, 3 pages, Jan. 31, 2013.

International Application No. PCT/US2012/040054, Written Opinion, 4 pages, Jan. 31, 2013.

Non-Final Office Action mailed Dec. 14, 2012, in Co-Pending U.S. Appl. No. 12/953,054, filed Nov. 23, 2010.

International Search Report and Written Opinion mailed Oct. 18, 2013, for International Application No. PCT/US2013/048327, 8 pages.

U.S. Appl. No. 13/841,237 of Lieb et al. filed Mar. 15, 2013.

Non-Final Office Action mailed Sep. 4, 2015, for U.S. Appl. No. 13/841,237 of Lieb et al. filed Mar. 15, 2013.

Non-Final Office Action mailed Jul. 16, 2015, for U.S. Appl. No. 13/841,237 of Lieb, A.M., et al., filed Nov. 23, 2010.

International Search Report and Written Opinion mailed Nov. 10, 2014, for International Application No. PCT/2014/049180, 7 pages.

U.S. Appl. No. 14/448,620 of Lieb, A.M. et al. filed Jul. 31, 2014.

Extended European Search Report mailed Feb. 25, 2016, for European Patent Application No./Patent No. 1279343.5—1957/2715556, 7 pages.

Final Office Action mailed Feb. 11, 2016, U.S. Appl. No. 13/841,237 of Lieb et al. filed Mar. 15, 2013.

Advisory Action mailed Apr. 5, 2016, for U.S. Appl. No. 12/953,054, of Lieb et al. filed Nov. 23, 2010.

Non-Final Office Action mailed Apr. 12, 2016, U.S. Appl. No. 14/448,620 of Lieb, A.M. et al. filed Jul. 31, 2014.

Final Office Action Mailed Jun. 27, 2016 in U.S. Appl. No. 14/448,620 of Lieb, A. et al. filed Jul. 31, 2014, 15 pages.

Advisory Action Mailed Jun. 7, 2016 in U.S. Appl. No. 13/841,237 of Lieb, A. filed Mar. 15, 2013, 3 pages.

"Accomplish Screen Sharing Using WebRTC", Stack Overlow; stackoverflow.com/questions/17542384/accomplish-screen-sharing-using-webrtc, 3 pages.

"Screen Sharing with WebRTC", Stack Overflow; stackoverflow.com/questions/13616449/screen-sharing-with-webrtc, 3 pages.

* cited by examiner clear|slide Live Demo

● Screen sharing is on.

Viewers can control your screen (cancel)
Leave your mouse still for a few seconds to allow viewers to take over.

When you're done – close the window and return to this page to continue.

Drawing Tools

METHOD AND SYSTEM FOR BROWSER-BASED CONTROL OF A REMOTE COMPUTER

CROSS-REFERENCE TO RELATED APPLICATIONS

This application claims the benefit of the following application which is incorporated by reference in its entirety, U.S. Provisional Application No. 61/491,319, entitled "METHOD FOR BROWSER-BASED CONTROL OF A REMOTE COMPUTER", filed May 30, 2011.

FIELD OF USE

The present disclosure relates to remote computer screen control, and more specifically, to controlling a remote computer over a communications network, such as the Internet, by one or more viewers, where a presenter and the viewers use only web browsers.

BACKGROUND

Often it is useful for a presenter to broadcast the contents of his computer screen over a network to remote viewers, such as to demonstrate the capabilities of a software product or website. During a screen sharing session, it is often useful to allow viewers to control the mouse and keyboard, so that the presenter and viewers can, for example, interactively fill out a form together, or the presenter and viewers can collaborate on editing a document, or the presenter can walk the viewers through a training session where the presenter coaches the viewers on how to complete a certain task.

Existing solutions which provide this type of functionality have several limitations. The presenter must normally download and install software (such as executables or plugins) to his computer in order to share the screen and allow remote viewers to control the screen. The viewers must also complete a time-consuming setup process, which can include software downloads and an email-based invitation setup process to connect the viewer to the presenter. These limitations prevent the use of these solutions in certain situations, such as a sales call.

DETAILED DESCRIPTION

A method and system for remote control of a presenter's computer screen using only web browsers is described. Viewers are able to view a reproduction of a presenter's screen on a screen of the viewer's device and remotely control the presenter's screen directly from a web browser using an embedded script, without any downloads, plugins, security windows, or dialog boxes. Viewer control events are captured by the browser, sent to a server, and transmitted to the presenter's computer. An applet running on a webpage in a web browser on the presenter's computer executes the control events, updates the presenter's screen, and transmits images of the updated screen back to the viewers via a server.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1A:
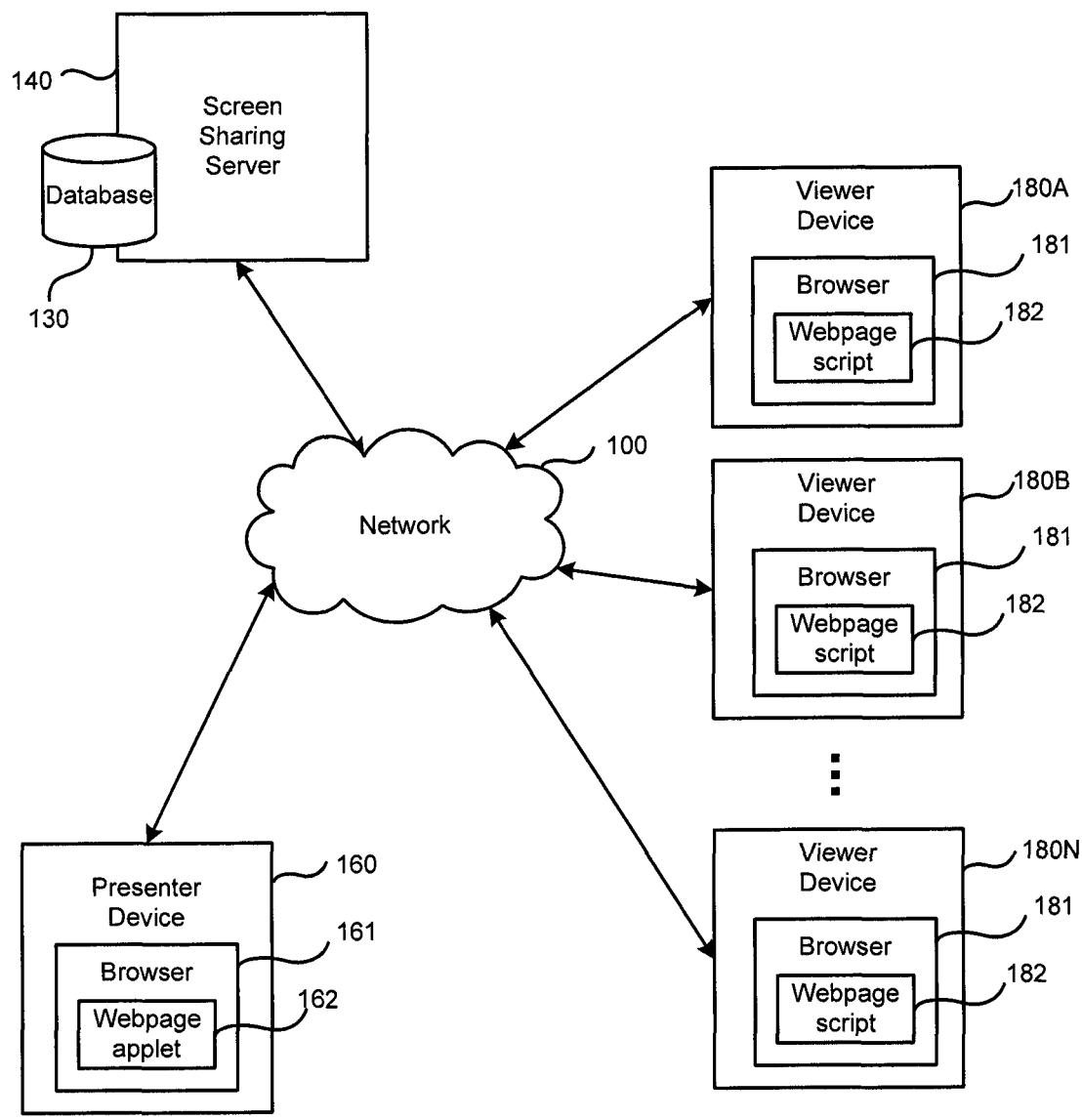
FIG. 1A illustrates a diagram of an example system where a screen sharing server supports remote control of a presenter's screen by one or more viewers.

FIG. 1A illustrates a diagram of an example system where a screen sharing server 140 supports remote control via a network 100 of a presenter's screen on a presenter device 160 by one or more viewers operating viewer devices 180A-180N.

The viewer devices 180 and presenter device 160 can be any system and/or device, and/or any combination of devices/systems that is able to establish a connection, including wired, wireless, cellular connections with another device, a server and/or other systems such as screen sharing server 140. Viewer devices 180 and presenter device 160 will typically include a display and/or other output functionalities to present information and data exchanged between or among the devices 180, 160 and/or the screen sharing server 140. In one embodiment, there is only a single screen sharing server 140. In one embodiment, there are multiple screen sharing servers 140 operating independently.

The viewer devices 180 and the presenter device 160 can include mobile, hand held, or portable devices, or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the viewer devices 180, screen sharing server 140, and presenter's device 160 are coupled via a network 100. In some embodiments, the viewer devices 180, the presenter device 160, and screen sharing server 140 may be directly connected to one another.

The viewer devices 180 and the presenter device 160 should each be capable of running a web browser 161, 181, 182, 183. The viewer device web browser 181, 182, 183 is used by the viewer operating viewer device 180 to access a uniform resource locator (URL) to view a series of images of a shared screen of the presenter's device 160. The presenter device web browser 161 is used by the presenter to access a webpage with an embedded applet that permits remote control of the presenter's screen.

The input mechanism on viewer devices 180 and presenter device 160 can include, but is not limited to, a touch screen keypad (including single touch, multi-touch, gesture sensing in 2D or 3D, etc.), a physical keypad, a keyboard, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at viewer devices 180 through one or more of the above input mechanisms, or others, can be used in the disclosed technology by various viewers for controlling, through network 100 and screen sharing server 140, a presenter's screen on a presenter device 160.

U.S. patent application Ser. No. 12/953,054, entitled "METHOD AND SYSTEM FOR BROWSER-BASED SCREEN SHARING", filed Nov. 23, 2010, describes a method and system of permitting a presenter to share his screen with one or more viewers while the presenter is actively using the screen, e.g. moving the cursor, typing text, and opening a window, and is hereby incorporated in its entirety.

In general, the present disclosure describes a method and system for allowing one or more viewers, each using only a web browser, to interact with the image of the shared presenter's screen through the screen sharing server 140. The presenter provides to viewers a viewer URL that uniquely identifies the presenter. When a viewer goes to the viewer URL using a web browser, the viewer sees a presentation slide or other content, such as images, selected by the presenter.

A presentation slide selected by the presenter that is a "live demo" slide loads a webpage in a web browser 161 running on the presenter device 160 that contains an embedded applet 162. In one embodiment, when the presenter selects a live demo slide, the server loads a 'live demo presenter URL' in the presenter's browser, by instructing a script to display the URL within an iframe. The viewer URL that the viewer accesses is different, although they share common identification via a URL parameter, so that the presenter and the viewer both connect to the same screen sharing session. The presenter's URL has an additional security token which grants access to allow the presenter to broadcast, rather than just view the presentation. Upon receiving permission from the presenter, the applet shares the presenter's screen with viewers who access the provided viewer URL without the viewer having to download any software or plug-ins. As the presenter moves the cursor on his screen, enters text, or interacts with the information displayed on the presenter's screen, the presenter's interactions are reflected on the viewer's monitors.

The presenter can choose to allow a select viewer or any viewer to remotely control his screen. The screen sharing server 140 ensures that only one person at a time controls the presenter's screen. The webpage corresponding to the viewer URL provided by the presenter contains an embedded script 182 that records control events made by the viewer's input mechanism, such as mouse movements, clicks, mouse wheel rotations, or keyboard strokes, and sends the control events to the server 140.

Then the embedded applet 162 running on the presenter's device checks the server 140 for new viewer control events and updates the presenter's screen with the new control events. Thus, when a viewer takes control, movements of the cursor and any interaction of the viewer with the image of the presenter's screen on the viewer's device is captured. The viewer's control events are subsequently reflected on the presenter's screen and the screens of any other viewers accessing the viewer URL.

The server can track the length of time screen sharing sessions, the viewers of the presenter's screen during a screen sharing session, and viewer control events. The server can also store the entire screen sharing session for later playback as a series of images, where the playback can be interactive with the person viewing the playback.

Figure 1B:
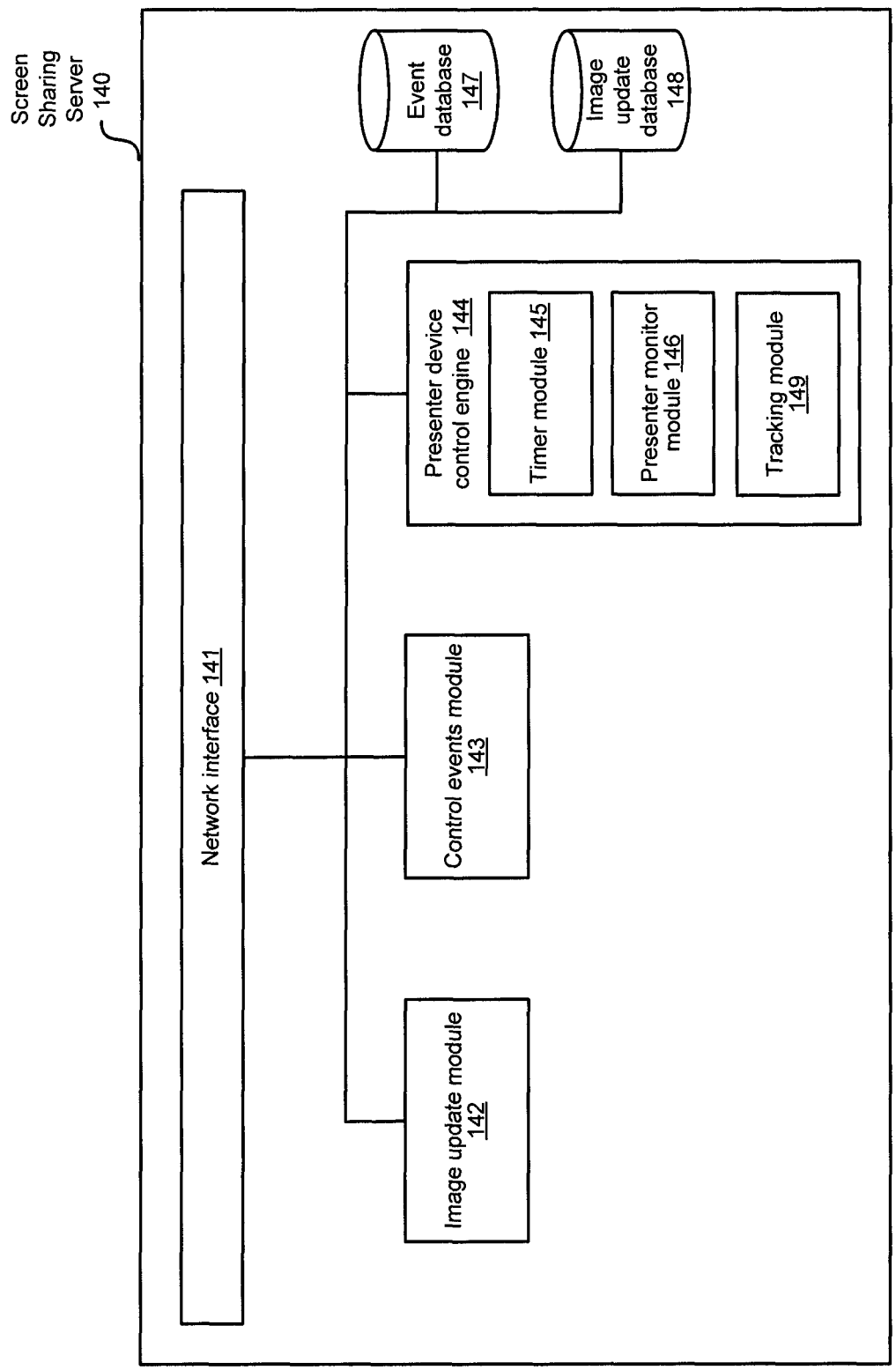
FIG. 1B depicts a block diagram illustrating an example of components in the screen sharing server that supports remote control of a presenter's screen.
Figure 1C:
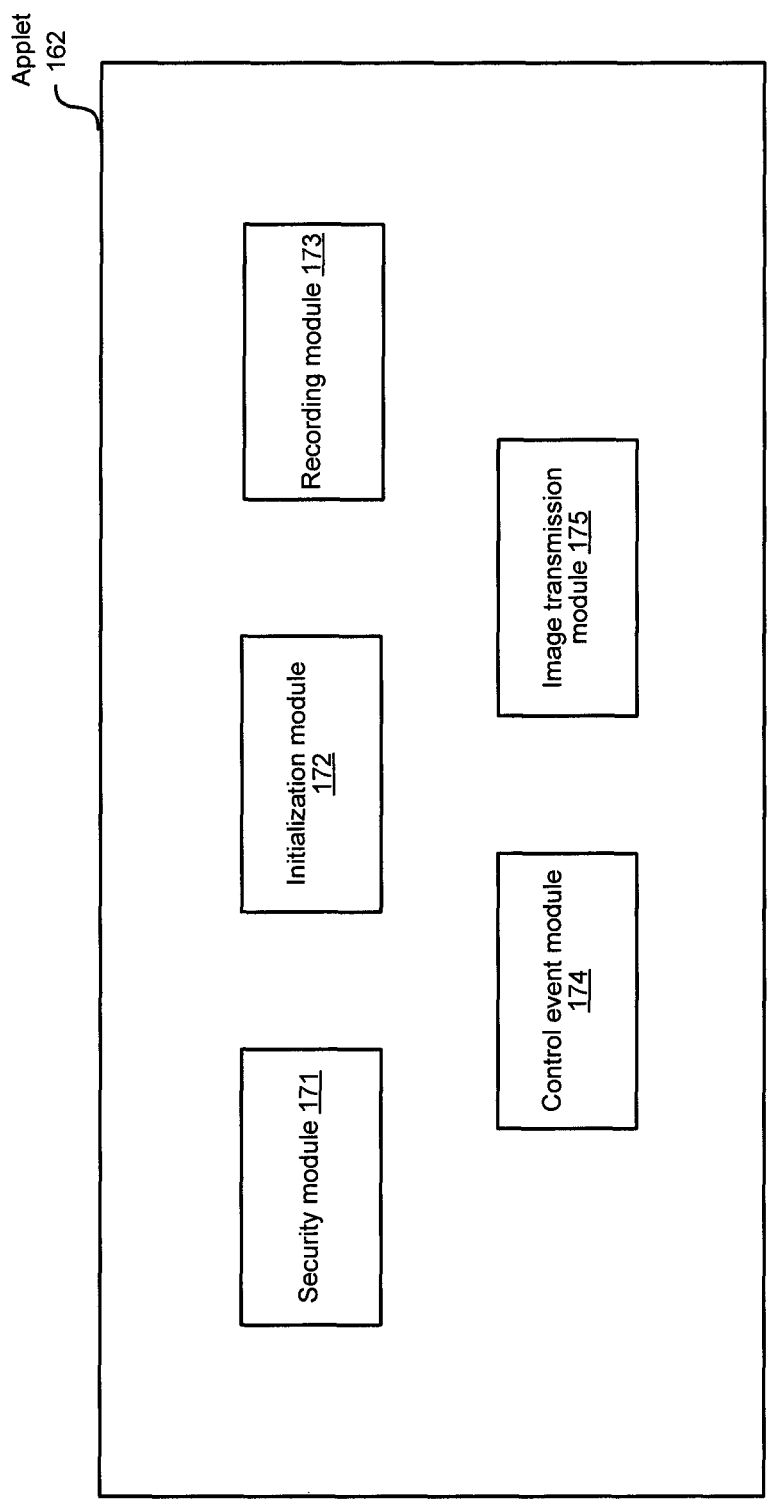
FIG. 1C depicts a block diagram illustrating an example of components in an applet embedded in a webpage accessed by the presenter that supports remote control of the presenter's screen.
Figure 1D:
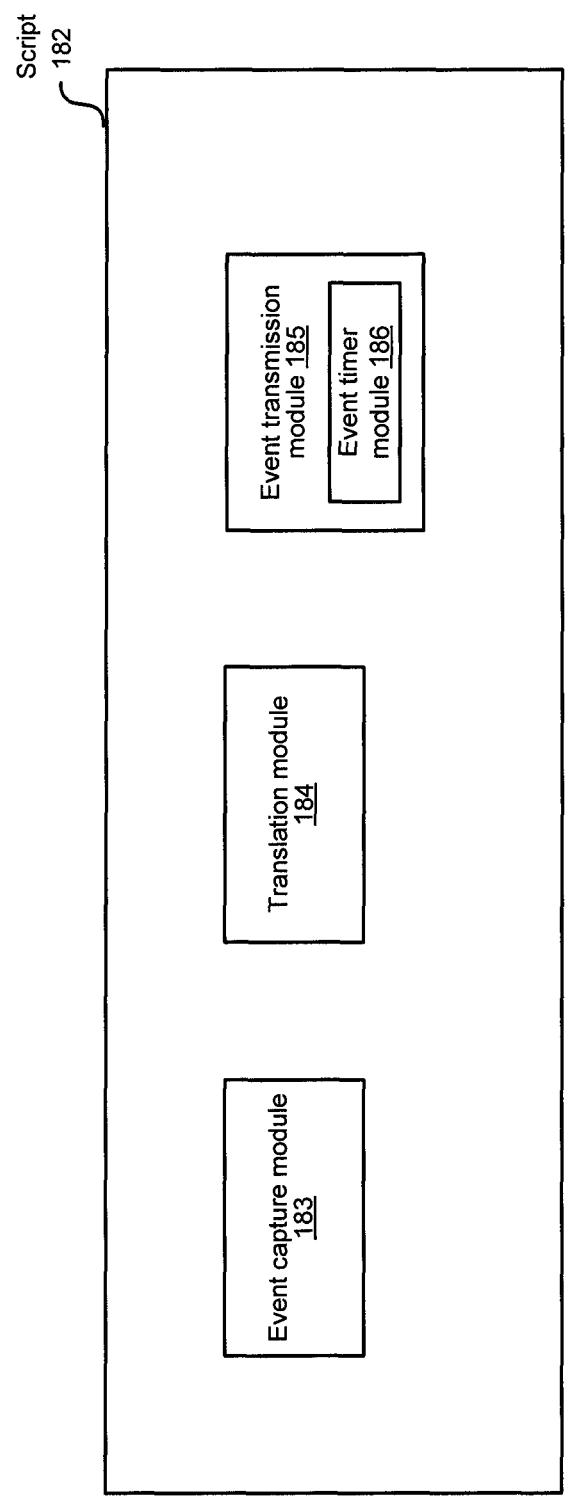
FIG. 1D depicts a block diagram illustrating an example of components in a script on a webpage loaded by a viewer's browser that supports remote control of the presenter's screen.

Functions and techniques performed by the screen sharing server 140, the webpage embedded applet 162 and the webpage script 182, are described, respectively, in detail with further reference to the examples of FIGS. 1B, 1C, and 1D.

In one embodiment, viewer devices 180 and the presenter device 160 communicate with the screen sharing server 140 over network 100. In general, network 100, over which the viewer devices 180, the screen sharing server 140, and/or the presenter device 160 communicate, may be a cellular network, a telephonic network, an open network, such as the Internet, or a private network, such as an intranet and/or the extranet, or any combination thereof.

FIG. 1B depicts a block diagram illustrating an example of components in the screen sharing server 140 that supports remote control of a presenter's screen.

The screen sharing server 140 can include, for example, a network interface 141, an image update module 142, a control events module 143, a presenter device control engine 144, an event database 147, and/or an image update database 148. Additional or fewer components/modules/engines can be included in the screen sharing server 140 and each illustrated component.

The network interface 141 can be a networking module that enables the screen sharing server 140 to mediate data in a network with an entity that is external to screen sharing server 140, through any known and/or convenient communications protocol supported by the host and the external entity. The screen sharing server 140 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the screen sharing server 140 includes the image update module 142 which receives from the embedded webpage applet 162 image updates of the entire presenter's screen or the portion of the presenter's screen that the presenter chooses to share with viewers. In one embodiment, the applet can be a java applet or other suitable executable code. The image update module 142 stores the received image updates in the image update database 148. In one embodiment, the image update module 142 can provide a time stamp to the received image updates, and the time stamps can be stored along with the image updates in the image update database 148 so that a video playback of the presenter's screen can be reconstructed at a later time.

One embodiment of the screen sharing server 140 includes the control events module 143 which receives from the embedded webpage scripts 182 control events made at any of the viewer devices 160. In one embodiment, the script is code written in any suitable form, such as JavaScript code, and the control event data is transmitted to the server through a JavaScript AJAX call that includes identification information pertaining to the viewer who performed the control events, such as an internet protocol (IP) address or a viewer identification (ID) parameter. The control events module 143 stores the received control events in the event database 147 along with the associated viewer identification information.

One embodiment of the screen sharing server 140 includes the presenter device control engine 144 which monitors the presenter's screen and tracks information about a screen sharing session. The presenter device control engine 144 can include a timer module 145, a presenter monitor module 146, and/or a tracking module 149.

While the presenter can explicitly permit a viewer to remotely control his screen, the presenter is always given priority for controlling his screen and can immediately override viewer control of his screen. The presenter monitor module 146 monitors the control events performed by the presenter. If a viewer is in the middle of controlling the presenter's screen, and the presenter performs a control event, the server can override the viewer's control and return control to the presenter.

The timer module 145 can track the time that a viewer is in control of the presenter's screen to ensure that only one person is controlling the screen at any given time. When the server receives information from the script 182 running on a viewer's webpage that a first viewer has performed a control event (or a series of control events in quick succession), such as moving the cursor or entering text, the control event is reproduced on the presenter's screen and the timer module 145 starts tracking the time. If the server receives a second control event (or series of control events) performed by the first viewer within an idle timeout period, the first viewer maintains control of the presenter's screen, and the second control event is reproduced on the presenter's screen.

However, if the idle timeout period, for example three seconds, is exceeded without having received a second control event from the first viewer, and a second viewer performs a control event, control of the presenter's screen passes to the second viewer. Thus, when a viewer has control of the presenter's screen, the viewer can maintain control until the viewer leaves the input mechanisms idle on his viewer device beyond the idle timeout period. At this point, another viewer can take over control of the presenter's screen. Viewers can interactively pass control of the presenter's screen without needing to explicitly set who has control. Alternatively, the presenter can select a particular viewer to take control of his screen, or the viewer can indicate that he has finished controlling the presenter's screen.

In one embodiment, the timer module 145 can also track the time that a presenter in control of the presenter's screen is idle to determine when to return control to viewers. When the server receives information from the applet 162 that the presenter has performed a control event, the timer module 145 starts tracking the time. If the server does not receive a subsequent control event from the presenter within a presenter idle timeout period, any viewer who performs a control event can take over control of the presenter's screen.

The tracking module 149 tracks information relating to a screen sharing session. Information tracked can include, but is not limited to, how long a screen sharing session lasted, the viewers viewing the session, the viewer control events and the associated viewer who performed the control events. The tracked information can be stored in event database 147. In one embodiment, the event database 147 stores just the control events from the viewers and presenters, while a separate database tracks statistics and/or persistent recordings of a screen sharing session Further, the tracking module 149 can maintain thumbnail images in the image update database 148 of what was displayed on the presenter's screen during the session. In one embodiment, the tracking module 149 can store the complete screen sharing session in the image update database 148 and subsequently play back the session as a video or similar re-construction of the session.

In one embodiment, the presenter and the viewers can maintain pre-established dedicated network connections to the server. A first dedicated network connection is used to transmit information between the presenter device and the server, such as captured images of the presenter screen sent to the server, viewer control events received from a viewer sent to the presenter device, and updated images of the presenter's screen sent to the server. A second dedicated network connection is used to transmit information between the viewer device and the server, such as viewer control events sent to the server, captured images and updated images of the presenter's screen sent to the viewer. Other dedicated network connections can be used between each distinct viewer device and the server.

FIG. 1C depicts a block diagram illustrating an example of components of an applet 162 embedded in a webpage viewed by the presenter that supports remote control of the presenter's computer screen. The applet can be a Java applet or other suitable executable code.

The embedded applet 162 can include, for example, a security module 171, an initialization module 172, a recording module 173, a control event module 174, and/or an image transmission module 175. Additional or fewer modules can be part of the embedded applet 162 and each illustrated component.

Figure 5:
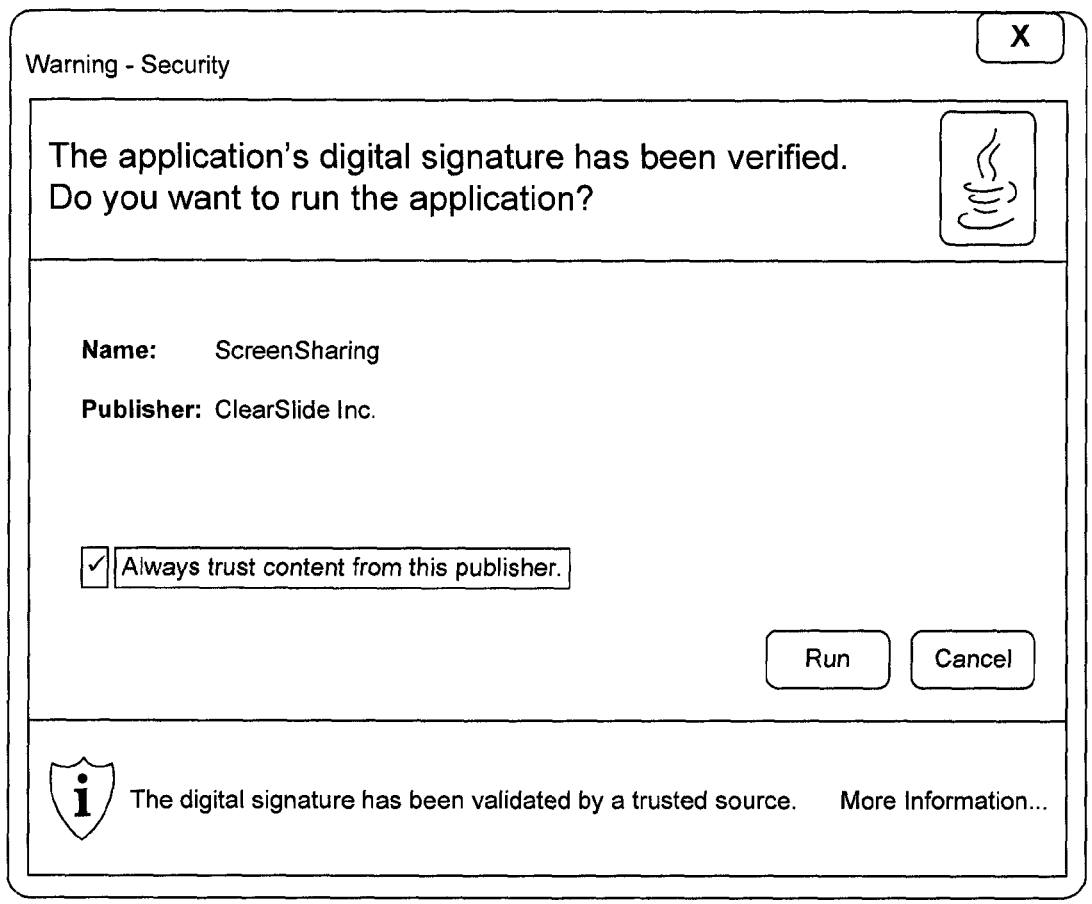
FIG. 5 shows an example screenshot of the browser's standard security dialog.

One embodiment of the embedded applet 162 includes the security module 171 which requests permission to run the applet functions. The embedded applet 162 is signed by a code signing certificate so the presenter's browser 161 automatically shows a permission dialog box, e.g. as shown in FIG. 5, to the presenter requesting permission to run the applet 162. Requesting permission is required because the embedded applet 162 operates by capturing and sending images of the presenter's screen, which is a security violation unless authorized. As will be appreciated, the exact permission window is specific to the web browser. Some web browsers include a checkbox that allows the presenter to skip this step on subsequent sessions.

Figure 6:
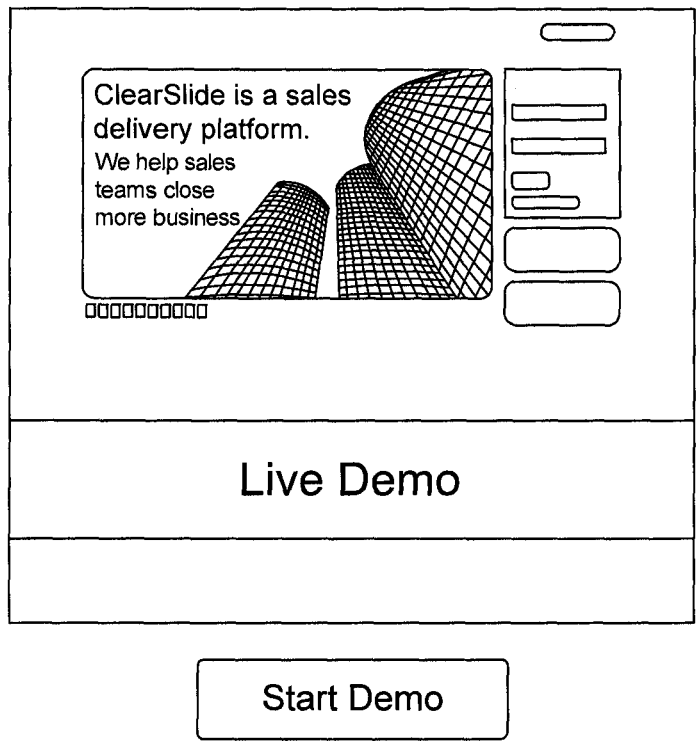
FIG. 6 shows an example screenshot of an initial user interface page shown to the presenter when screen sharing begins.
Figure 7:
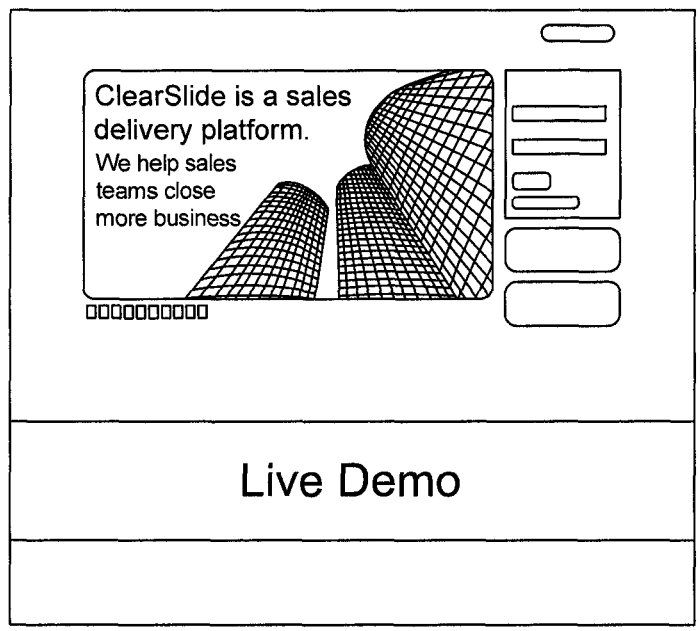
FIG. 7 shows an example screenshot of a user interface page shown to the presenter once the presenter has allowed viewer control of his screen.
Figure 7:

The security module 171 also queries the presenter as to whether viewers should be permitted to control the presenter's screen remotely, for example, showing the user interface page in FIG. 6 to the presenter. If the presenter grants permission, the security module 171 presents, for example, the user interface page shown in FIG. 7 to the presenter to alert the presenter that his screen can now be controlled remotely. The presenter's permission is sent to the screen sharing server, and the server transmits a command to the viewer's script that it can control the presenter's screen. Without the presenter's permission, the viewer's script does not record viewer control events in order to optimize performance of the system. The presenter can disable viewer control at any time by performing his own control events or revoking permission for the applet to run. If the presenter resumes control of the screen or another viewer gains control during an idle period, the first viewer that was controlling the screen is informed by an on-screen message that his control events are no longer being applied.

One embodiment of the embedded applet 162 includes the initialization module 172 which initializes the applet after permission is received from the presenter to run the applet. The webpage accessed by the presenter's browser can pass initialization information to the embedded applet 162, including a token which uniquely and securely identifies the presentation, a "key" which controls who can present, and other useful initialization parameters.

One embodiment of the embedded applet 162 includes the recording module 173 which records an image of the presenter's screen after initialization. In one embodiment, the recording module 173 stores the recorded screen image locally on the presenter device 160. In one embodiment, the image transmission module 175 transmits the recorded screen image to the server for storage. In some embodiments, the embedded applet 162 provides feedback to the presenter that screen sharing has started. The feedback may include, for example, the user interface page shown in FIG. 6, a red blinking light and/or an error message if screen sharing could not be started due to an error.

In one embodiment, the recording module 173 is triggered to capture an image of the presenter's screen immediately after a new viewer control events are executed on the presenter's screen. In one embodiment, the recording module 173 also captures a screen image of the presenter's screen even if no new viewer control events have been received, such as when the presentation has just begun, the presentation display area has changed, or the screen sharing server requests a full refresh. Other conditions for capturing a screen image are discussed in co-pending U.S. patent application Ser. No. 12/953,054.

One embodiment of the embedded applet 162 includes the control event module 174 which checks with the screen sharing server 140 for new control events received from viewers. Control events can include mouse control events, such as mouse down, mouse up, and other mouse movements. Mouse control events include data on the position of the mouse and which mouse button was pushed, if any. Control events can also include keyboard events, such as key down and key up. Keyboard control events include data on which key was pressed. Other control events using other input mechanisms can also be performed by viewers and transmitted to the server 140.

Once the control event module 174 identifies via the server 140 new control events performed by viewers, the control event module 174 executes these control events on the presenter's screen in the order they were received. The mouse move events may be approximations, for example, instead of sending the entire mouse path obtained from the viewers, the cursor movement on the presenter's screen may only include the start and end points. In one embodiment, the control event module 174 can create a reasonable path on the presenter's screen to mimic a natural human movement. Or, for key events, the control event module 174 may also insert delays between the events to mimic normal human typing rates.

One embodiment of the embedded applet 162 includes the image transmission module 175 which transmits captured screen images of the presenter's screen to the server 140. By sending an updated image of the presenter's screen to the server after new viewer control events have been executed, the updated images are reflected on the viewers' screens to immediately show the viewer who performed the control events the result of the events on the viewer's screen almost immediately.

FIG. 1D depicts a block diagram illustrating an example of components of a webpage script 182 loaded by a viewer's browser that supports remote control of the presenter's screen.

The webpage script 182 can include, for example, an event capture module 183, a translation module 184, and/or an event transmission module 185. Additional or fewer modules can be part of the script 182 and each illustrated component.

One embodiment of the webpage script 182 includes the event capture module 183 which records control events made by the viewer. The event capture module 183 is operative only if the presenter has given permission for viewers to control the presenter's screen.

One embodiment of the webpage script 182 includes the translation module 184 which translates cursor coordinates from a viewer's coordinate system to the presenter's coordinate system if the presenter decides to share only a portion of his screen with the viewer. For example, only the upper quadrant of the presenter's screen may be shared and mapped to the viewer's browser window. Then movements of the cursor on the viewer's screen in the viewer's coordinate system associated with the viewer's browser window are translated by the translation module 184 to the presenter's coordinate system associated with the upper quadrant of the presenter's screen.

One embodiment of the webpage script 182 includes the event transmission module 185 which transmits a single viewer control event or batched viewer control events to the server 140. The event transmission module 185 includes an event timer module 186. When a viewer performs a control event, the event timer module 186 starts timing an idle timeout period. If the viewer does not perform any other control events within the idle timeout period, the event transmission module 185 transmits the control event data to the server 140. In some embodiments, an AJAX call is used by the event transmission module 185 to transmit the control event data. If the viewer performs other control events within the idle timeout period, the event transmission module 185 batches the control events together into a single AJAX request. By batching multiple control events, the event transmission module 185 avoids sending an unnecessarily large number of mouse movement events, resulting in better performance of the system.

Figure 2:
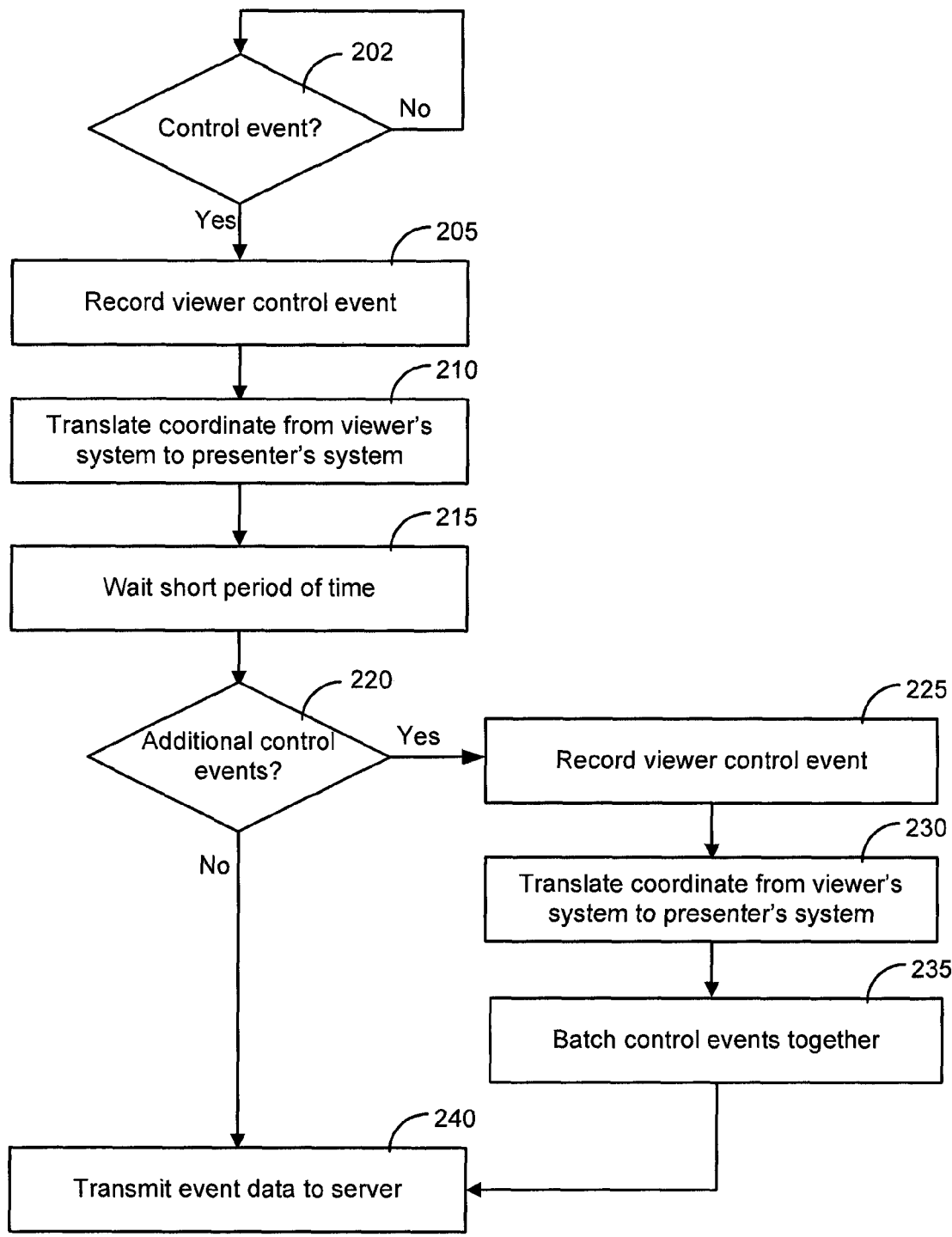
FIG. 2 depicts a flow chart illustrating an example process performed by a script on a webpage loaded on a viewer's browser for capturing control events made by the viewer.

FIG. 2 depicts a flow chart illustrating an example process performed by a script embedded in a webpage loaded on a viewer's browser for capturing control events made by the viewer.

At decision block 202, the script determines if a viewer control event has occurred. A viewer control event is any input made by a viewer using an input mechanism on the viewer's device, such as, but not limited to, a mouse or keyboard. For example, an input can be a movement of the mouse that moves the cursor on the screen from the top right corner to the bottom right corner, or a series of keystrokes made on a keyboard by the viewer. If no control event has occurred (block 202—No), the process remains at decision block 202.

If a control event occurs (block 202—Yes), at block 205, the script records the viewer control event. The recording process occurs after the presenter has given permission for a viewer to remotely control his computer.

In some instances, a presenter is only sharing a portion of his screen with the viewer. If this is the case and the viewer makes a control movement across the screen, for example, a mouse movement associated with a movement of the cursor, at block 210, the script translates mouse coordinates from the viewer's coordinate system to the presenter's coordinate system.

Then at block 215, the script waits a short period of time to determine if any additional events occur within a batching time period after the first control event. At decision block 220, the script determines whether any additional control events have occurred within the batching time period. If no additional events have occurred (block 220—No), at block 240, the script transmits the control event data to the screen sharing server 140. In one embodiment, the script transmits an AJAX request to the server.

If additional control events occur (block 220—Yes), at block 225 the script records the additional viewer control events. Similar to block 210, at block 230, if the presenter is only sharing a portion of his screen and the viewer makes a control movement over the screen, the script translates mouse coordinates from the viewer's coordinate system to the presenter's coordinate system.

At block 235, the script batches the multiple recorded viewer control events together into a single request. Batching of viewer control events that occur in quick succession increases the performance of the system and avoids sending an unnecessarily large number of mouse movements. The process continues to block 240 where the batched control events are transmitted to the server, for example, in a single AJAX call.

Figure 3:
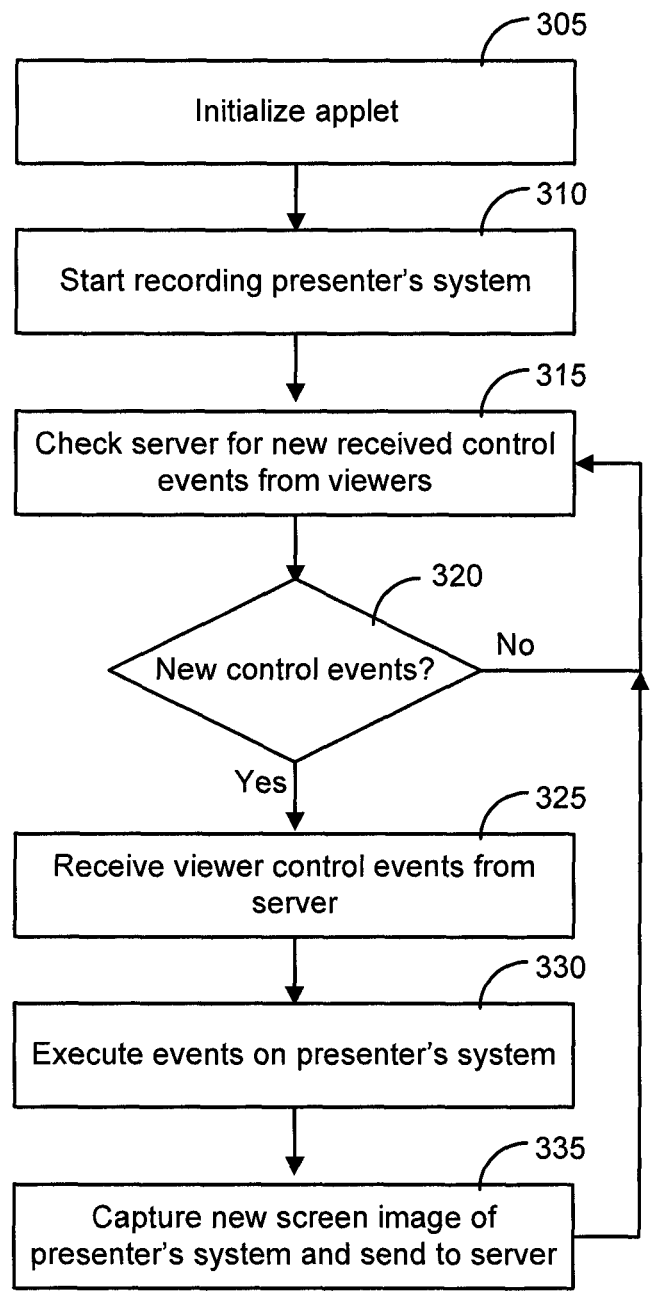
FIG. 3 depicts a flow chart illustrating an example process performed by an applet embedded in a webpage viewed by a presenter on the presenter's browser for processing viewer control events.

FIG. 3 depicts a flow chart illustrating an example process performed by an applet embedded in a presentation slide accessed by a presenter on the presenter's browser for processing viewer control events.

At block 305, after the presenter has given permission to run the embedded webpage applet, the applet initializes. The webpage accessed by the presenter's browser passes initialization information to the embedded applet, including a token which uniquely and securely identifies the presentation, a "key" which controls who can present, and other useful initialization parameters.

Next, at block 310, the applet starts recording images of the presenter's screen. In one embodiment, the applet records images of the presenter's screen at periodic intervals. In one embodiment, the applet records images of the presenter's screen only if new presenter control events are performed or after a given interval of time.

At block 315, the applet checks with the server for new control events that have been received from participating viewers. Then at decision block 320, the applet determines if any new control events have been received. If no new control events have been received by the server (block 320—No), the procedure returns to block 315.

If new control events have been received by the server (block 320—Yes), at block 325, the applet receives the new viewer control events from the server.

Then at block 330, the applet executes the newly received control events on the presenter's system so that the presenter's screen reflects the control events performed by the viewer.

Next, at block 335 the applet captures a new screen image of the presenter's system immediately and sends it to the server.

Figure 4A:
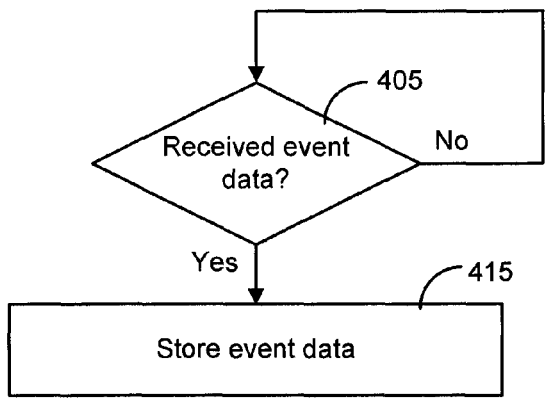
FIGS. 4A-4C depict flow charts illustrating example processes performed by the screen sharing server to support remote control of the presenter's screen.

FIG. 4A depicts a flow chart illustrating an example process performed by the screen sharing server for receiving control event data from a viewer and updating participating screens of other viewers and the presenter.

At decision block 405, the server determines whether control event data has been received. If no control event data has been received (block 405—No), the process remains at decision block 405.

If control event data has been received (block 405—Yes), at block 415, the server stores the event data in an event data database.

Figure 4B:
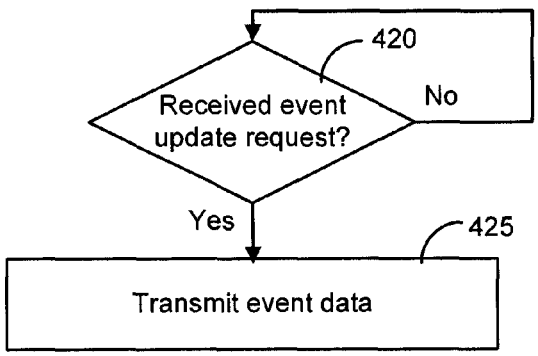

FIG. 4B depicts a flow chart illustrating an example process performed by the screen sharing server for updating the presenter screen with control event data from a viewer.

At decision block 420, the server determines whether a request from the embedded applet running on the presenter device's browser has sent a request for any new control event data. If no event data request has been received (block 420—No), the process remains at decision block 420.

If an event data request has been received (block 420—Yes), at block 425, the server transmits the control event data to the applet running on the presenter's device for updating the presenter's screen.

Figure 4C:
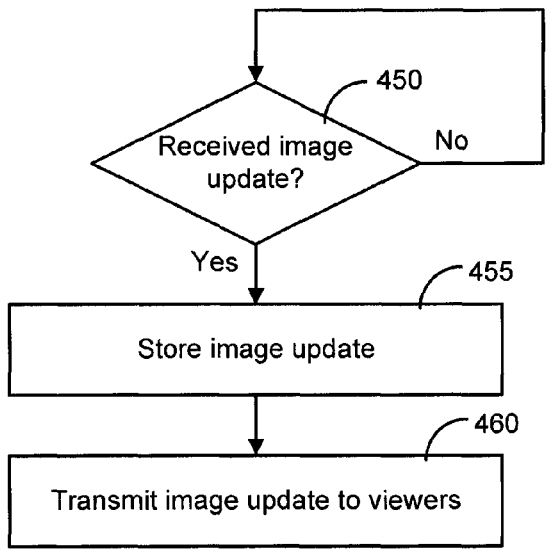

FIG. 4C depicts a flow chart illustrating an example process performed by the screen sharing server for receiving image updates of the presenter's screen and updating participating screens of the viewers.

At decision block 450, the server determines whether an image update of a presenter's screen has been received. If no image updates have been received (block 450—No), the process remains at decision block 450.

If an image update has been received (block 405—Yes), at block 455, the server stores the image update in an image update database. Then at block 460, the server transmits the image update of the presenter's screen to the viewer devices.

Figure 8:
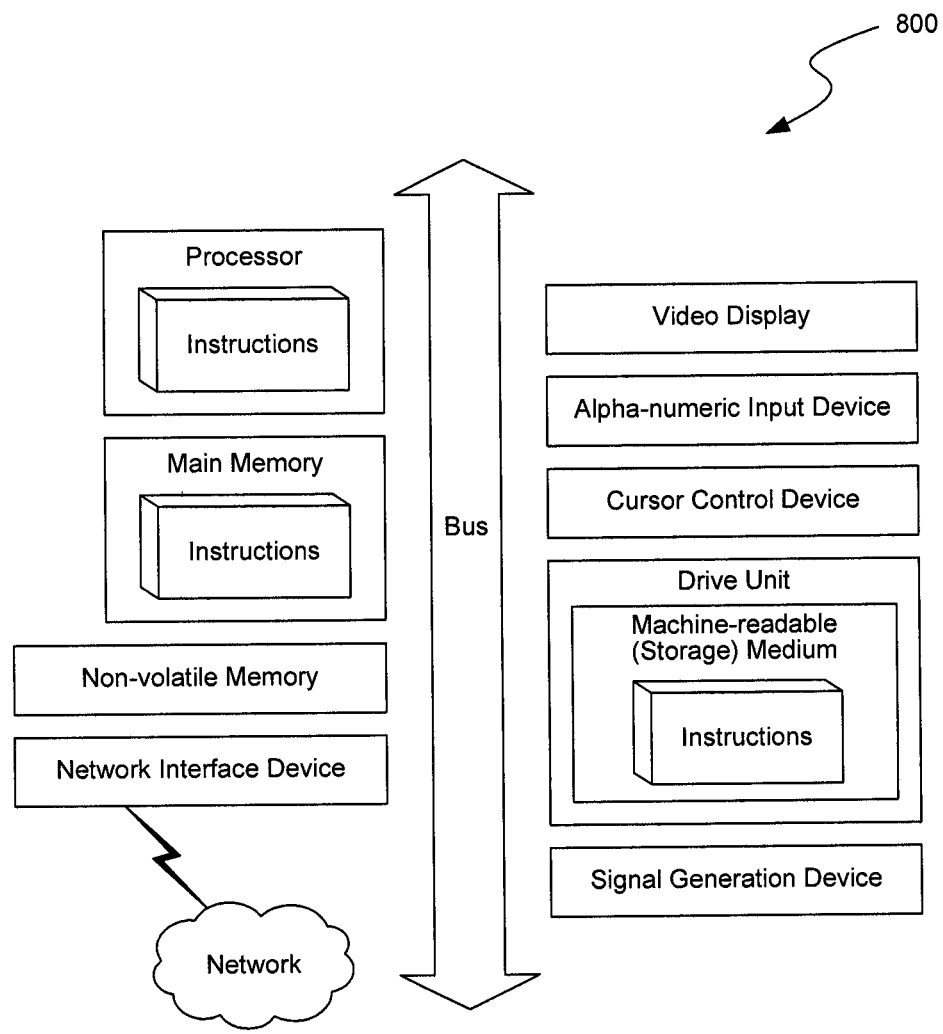
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine 800 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A computer-implemented method comprising:
   detecting at a server a screen sharing instruction from a presenter during a synchronous presentation session in which the server is configured to transfer a sequence of presentation slides corresponding to a presentation, which is stored on the server and associated with the presenter, to one or more viewers responsive to the presenter controlling the sequence;
   in response to detecting the screen sharing instruction from the presenter, transmitting by the server a presentation viewing webpage to a presenter browser, the presentation viewing webpage configured to capture images of a presenter's screen associated with a presenter device, wherein the presentation viewing webpage includes a screen sharing applet or a plurality of web browser instructions;
   receiving at the server the images of the presenter's screen associated with the presenter device for sharing with the one or more viewers;
   transmitting by the server the received images of the presenter's screen to the one or more viewers via a viewer webpage that is suitable for loading in a viewer web browser, wherein the viewer webpage includes an embedded script that is configured to (1) display the images of the presenter's screen without requiring an applet in the viewer web browser, and (2), when permitted, capture a plurality of control events and transmit the plurality of control events to the server;
   detecting at the server an instruction allowing the one or more viewers to take control of the presenter's screen;
   receiving from a first embedded script loaded in the a web browser of a first viewer control events performed by the first viewer to remotely control the presenter's screen, wherein the control events are performed by the first viewer in relation to what is displayed in the viewer web browser; and
   transmitting by the server the control events performed by the first viewer to the screen sharing applet or another applet running in the presentation viewing webpage, wherein the screen sharing applet or another applet executes the control events on the presenter's screen;
   tracking an idle timeout period;
   transmitting subsequent control events from the first viewer to the screen sharing applet or the another applet for execution on the presenter's screen if the subsequent control events are received within the idle timeout period;
   otherwise, transmitting control events received from a second viewer to the screen sharing applet or the another applet for execution if the second viewer executes control events.

2. The method of claim 1, further comprising:
   receiving from the screen sharing applet or the another applet updated images of the presenter's screen after the screen sharing applet or the another applet executes the control events on the presenter's screen; and
   transmitting the updated images to the one or more viewers via the viewer webpage.

3. The method of claim 1, further comprising persistently storing the received images of the presenter's screen.

4. The method of claim 3, further comprising playing back the stored images of the presenter's screen as an interactive series of images at a later time.

5. The method of claim 1, further comprising storing the received control events.

6. The method of claim 1, wherein the first viewer is one of the viewers viewing the images of the presenter's screen.

7. The method of claim 6, further comprising maintaining statistics pertaining to sharing the presenter's screen, wherein statistics includes at least one of how long the presenter's screen was shared, identification of the plurality of viewers, the first viewer's control events with the first viewer's identification, additional control events performed by additional viewers with the additional viewers' identification.

8. The method of claim 1, further comprising:
   transmitting a command to the embedded script to display a user interface message on the viewer device that the first viewer has lost control of the presenter's screen if the first viewer is idle longer than the idle timeout period and the second viewer executes control events.

9. The method of claim 8, further comprising:
receiving from the presenter a selected viewer for controlling the presenter's screen;
transmitting only additional control events from the selected viewer for execution on the presenter's screen.

10. The method of claim 8, further comprising:
receiving a first input from the presenter to stop transmitting control events from the plurality of viewers;
transmitting a command to the embedded script on an interrupted viewer's webpage to display a user interface message on the interrupted viewer's device that the interrupted viewer has lost control of the presenter's screen.

11. The method of claim 10, further comprising:
receiving a second input from the presenter to resume transmitting control events from the plurality of viewers.

12. The method of claim 1, further comprising:
upon receiving at the server presenter control events performed by the presenter, pre-empting any viewer's control of the presenter's screen;
returning control of the presenter's screen to the presenter;
transmitting a command to the embedded script on the pre-empted viewer's webpage to display a user interface message on the pre-empted viewer's device that the pre-empted viewer has lost control of the presenter's screen.

13. The method of claim 12, further comprising:
tracking a presenter idle timeout period;
transmitting additional control events from any viewer to the screen sharing applet or the another applet for execution on the presenter's screen if the additional control events are received after the presenter idle timeout period.

14. The method of claim 1, wherein control events include one or more of: mouse movements, mouse button clicks, mouse wheel rotations, mouse wheel clicks, and keyboard inputs.

15. The method of claim 1, wherein the images of the presenter' screen shared with the viewer only show a portion of the presenter' screen.

16. The method of claim 1, wherein the presenter and viewer web browser are software programs that can access web sites and information over a network.

17. A server system comprising:
a processor; and
a memory storing a plurality of instructions which, when executed by the processor, configure the processor to:
detect a screen sharing instruction from a presenter during a synchronous presentation session in which the server is configured to transfer a sequence of presentation slides corresponding to a presentation, which is stored on the server and associated with the presenter, to one or more viewers responsive to the presenter controlling the sequence;
in response to detecting the screen sharing instruction from the presenter, transmit a presentation viewing webpage to a presenter browser, the presentation viewing webpage configured to capture images of a presenter's screen associated with a presenter device, wherein the presentation viewing webpage including a screen sharing applet or a plurality of web browser instructions;
receive the images of the presenter's screen associated with the presenter device for sharing with the one or more viewers;
transmit the received images of the presenter's screen to the one or more viewers via a viewer webpage that is suitable for loading in a viewer web browser, wherein the viewer webpage includes an embedded script that is configured to (1) display the images of the presenter's screen without requiring an applet in the viewer web browser, and (2), when permitted, capture a plurality of control events and transmit the plurality of control events to the server;
detect an instruction allowing the one or more viewers to take control of the presenter's screen;
receive from a first embedded script loaded in the a web browser of a first viewer control events performed by the first viewer to remotely control the presenter's screen, wherein the control events are performed by the first viewer in relation to what is displayed in the viewer web browser;
transmit the control events performed by the first viewer to the screen sharing applet or another applet running in the presentation viewing webpage, wherein the screen sharing applet or the another applet executes the control events on the presenter's screen;
track an idle timeout period; and
transmit subsequent control events from the first viewer to the screen sharing applet or the another applet for execution on the presenter's screen if the subsequent control events are received within the idle timeout period;
otherwise, transmit control events received from a second viewer to the screen sharing applet or the another applet for execution if the second viewer executes control events.

18. The server of claim 17, the processor further configured to:
receive from the screen sharing applet or the another applet updated images of the presenter's screen after the screen sharing applet or the another applet executes the control events on the presenter's screen; and
transmit the updated images to the one or more viewers via the viewer webpage.

19. The server of claim 17, the processor further configured to persistently store the received images of the presenter's screen.

20. The server of claim 19, the processor further configured to play back the stored images of the presenter's screen as an interactive series of images at a later time.

21. The server of claim 17, the processor further configured to store the received control events.

22. The server of claim 17, wherein the first viewer is one of the viewers viewing the images of the presenter's screen.

23. The server of claim 22, the processor further configured to maintain statistics pertaining to sharing the presenter's screen, wherein statistics includes at least one of how long the presenter's screen was shared, identification of the plurality of viewers, the first viewer's control events with the first viewer's identification, additional control events performed by additional viewers with the additional viewers' identification.

24. The server of claim 17, the processor further configured to:
transmit a command to the embedded script to display a user interface message on the viewer device that the first viewer has lost control of the presenter's screen if the first viewer is idle longer than the idle timeout period and the second viewer executes control events.

25. The server of claim 24, the processor further configured to:
receive from the presenter a selected viewer for controlling the presenter's screen;
transmit only additional control events from the selected viewer for execution on the presenter's screen.

26. The server of claim 24, the processor further configured to:
receive a first input from the presenter to stop transmitting control events from the plurality of viewers;
transmit a command to the embedded script on an interrupted viewer's webpage to display a user interface message on the interrupted viewer's device that the interrupted viewer has lost control of the presenter's screen.

27. The server of claim 26, the processor further configured to:
receive a second input from the presenter to resume transmitting control events from the plurality of viewers.

28. The server of claim 17, the processor further configured to:
upon receiving at the server presenter control events performed by the presenter, pre-empt any viewer's control of the presenter's screen;
return control of the presenter's screen to the presenter;
transmit a command to the embedded script on the pre-empted viewer's webpage to display a user interface message on the pre-empted viewer's device that the pre-empted viewer has lost control of the presenter's screen.

29. The server of claim 28, the processor further configured to:
track a presenter idle timeout period;
transmit additional control events from any viewer to the screen sharing applet or the another applet for execution on the presenter's screen if the additional control events are received after the presenter idle timeout period.

30. The server of claim 17, wherein control events include one or more of: mouse movements, mouse button clicks, mouse wheel rotations, mouse wheel clicks, and keyboard inputs.

31. The server of claim 17, wherein the images of the presenter's screen shared with the viewer only show a portion of the presenter's screen.

32. The server of claim 17, wherein the presenter and viewer web browser are software programs that can access web sites and information over a network.

* * * * *